(12) United States Patent
Abuelsaad et al.

(10) Patent No.: US 9,342,527 B2
(45) Date of Patent: *May 17, 2016

(54) SHARING ELECTRONIC FILE METADATA IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,390

(22) Filed: Apr. 23, 2015

(65) Prior Publication Data

US 2015/0227546 A1 Aug. 13, 2015

Related U.S. Application Data

(63) Continuation of application No. 13/706,614, filed on Dec. 6, 2012, now Pat. No. 9,122,696.

(51) Int. Cl.
*G06F 17/30* (2006.01)
(52) U.S. Cl.
CPC .... *G06F 17/30194* (2013.01); *G06F 17/30067* (2013.01); *G06F 17/30165* (2013.01); *G06F 17/30365* (2013.01); *G06F 17/30864* (2013.01); *G06F 17/30997* (2013.01)

(58) Field of Classification Search
CPC ................ G06F 17/30194; G06F 17/30067; G06F 17/30165
USPC ................................................. 707/758, 827
See application file for complete search history.

(56) References Cited

U.S. PATENT DOCUMENTS

| | | | |
|---|---|---|---|
| 6,658,417 B1 * | 12/2003 | Stakutis et al. | |
| 7,054,927 B2 | 5/2006 | Ulrich et al. | |
| 7,730,094 B2 | 6/2010 | Kaler et al. | |
| 2004/0255247 A1 * | 12/2004 | Demsky et al. | 715/530 |
| 2011/0022642 A1 | 1/2011 | deMilo et al. | |
| 2011/0161297 A1 | 6/2011 | Parab | |

(Continued)

OTHER PUBLICATIONS

Yinjin Fu et al., A Novel Dynamic Metadata Management Scheme for Large Distributed Storage Systems, 2008, IEEE, 897-992.*

(Continued)

*Primary Examiner* — Jean B Fleurantin
(74) *Attorney, Agent, or Firm* — John R. Pivnichny; Madeline F. Schiesser; Keohane & D'Alessandro PLLC

(57) ABSTRACT

Embodiments of the present invention provide an approach for sharing electronic file metadata in a networked computing environment (e.g., a cloud computing environment). In a typical embodiment, metadata related to electronic files stored in a shared storage device is maintained and updated. Such metadata may be viewable via a user interface of one or more applications used to access the files (e.g., from a plurality of computerized/electronic devices). Among other things, the metadata may identify previous accesses of the files (e.g., by user, date/time, etc.), and may be provided in a list or the like.

15 Claims, 7 Drawing Sheets

(56) References Cited

U.S. PATENT DOCUMENTS

| 2011/0247074 | A1 | 10/2011 | Manring et al. |
| 2011/0252071 | A1 | 10/2011 | Cidon |
| 2011/0271067 | A1 | 11/2011 | Chou et al. |
| 2013/0036272 | A1 | 2/2013 | Nelson |
| 2013/0254163 | A1 | 9/2013 | Savage et al. |
| 2013/0282657 | A1* | 10/2013 | Besen et al. ............ 707/625 |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

Mell, P. et al., "The NIST Definition of Cloud Computing", National Institute of Standards and Technology, Information Technology Laboratory, Vers. 15, Oct. 7, 2009, 2 pages.

"Security", Dropbox Security—Dropbox for Teams, https://www.dropbox.com/teams/security, 2 pages, Nov. 25, 2012.

Li, B. et al., "Distributed Metadata Management Scheme in Cloud Computing", Bejing University of Post and Telecommunication, pp. 32-38. Copyright 2011.

Jean B. Fleurantin, USPTO Office Action, U.S. Appl. No. 13/706,614, Notification Date Sep. 24, 2014, 10 pages.

Jean B. Fleurantin, USPTO Final Office Action, U.S. Appl. No. 13/706,614, Notification Date Dec. 4, 2014, 12 pages.

Jean B. Fleurantin, USPTO Notice of Allowance and Fee(s) Due, U.S. Appl. No. 13/706,614, Date Mailed Mar. 27, 2015, 17 pages.

John Bresnahan et al., "Cumulus: An Open Source Storage Cloud for Science", Science Cloud '11, Jun. 8, 2011, San Jose, California, USA, Copyright 2011, pp. 25-31.

Jean B. Fleurantin, USPTO Notice of Allowance and Fee(s) Due, U.S. Appl. No. 13/706,614, Date Mailed Apr. 22, 2015, 16 pages.

* cited by examiner

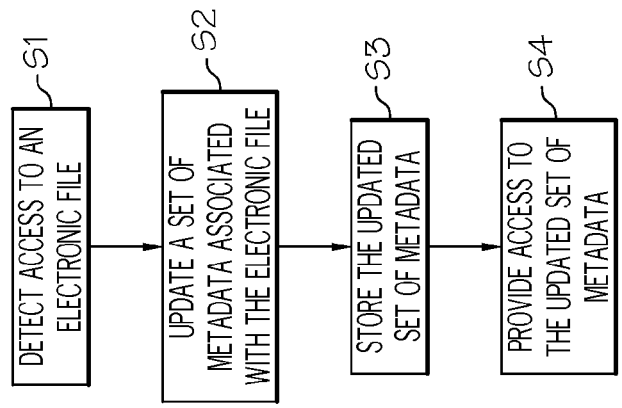
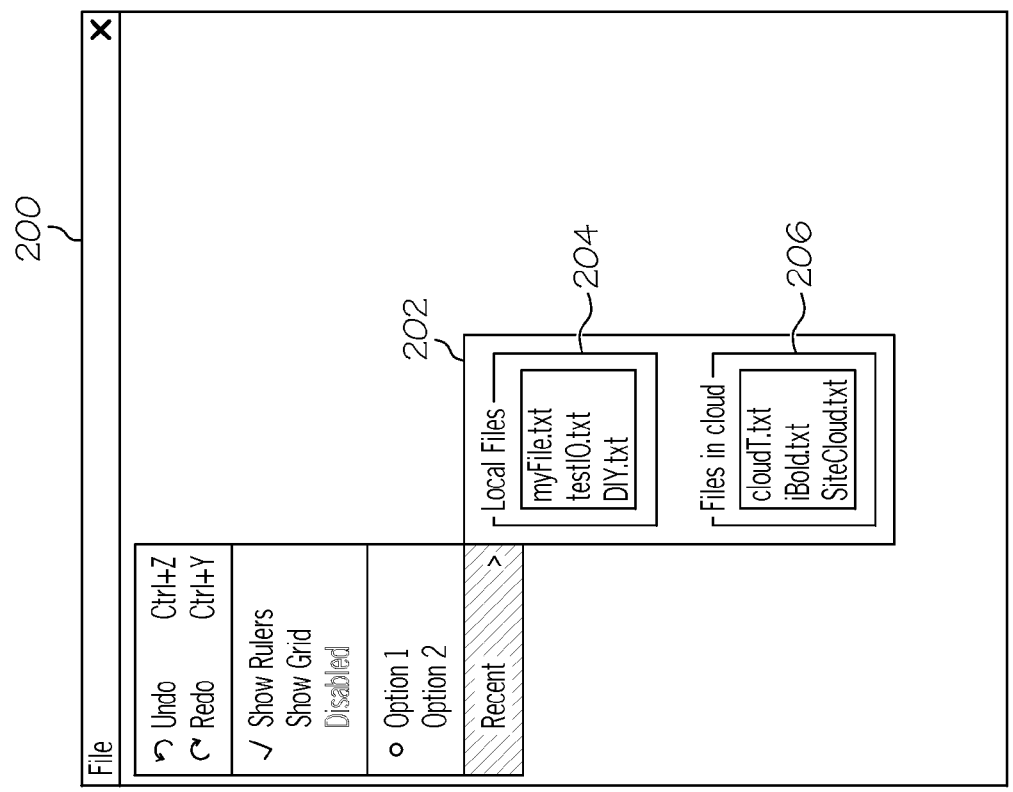

SHARING ELECTRONIC FILE METADATA IN A NETWORKED COMPUTING ENVIRONMENT

RELATED U.S. APPLICATION DATA

The present patent document is a continuation of U.S. patent application Ser. No. 13/706,614, filed Dec. 6, 2012, entitled "SHARING ELECTRONIC FILE METADATA IN A NETWORKED COMPUTING ENVIRONMENT", the disclosure of which is incorporated herein by reference.

TECHNICAL FIELD

In general, embodiments of the present invention relate to electronic file metadata. Specifically, embodiments of the present invention relate to the sharing of electronic file metadata in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In cloud computing and shared file systems, users may store files in a storage location from which the files may be accessed using various computers and/or devices. Challenges may exist, however, in providing current metadata for such files in a shared environment. Such challenges may be complicated as the size of a given directory or folder grows, thus making it more difficult to efficiently locate desired files or readily obtain pertinent information about such files.

SUMMARY

Embodiments of the present invention provide an approach for sharing electronic file metadata in a networked computing environment (e.g., a cloud computing environment). In a typical embodiment, metadata related to electronic files stored in a shared storage device is maintained and updated. Such metadata may be viewable via a user interface of one or more applications used to access the files (e.g., from a plurality of computerized/electronic devices). Among other things, the metadata may identify previous accessing of the files (e.g., by user, date/time, etc.), and may be provided in a list or the like.

A first aspect of the present invention provides a computer-implemented method for sharing file metadata in a networked computing environment, comprising: detecting an opening of an electronic file while the electronic file is being stored in a cloud-based shared storage device of the networked computing environment; updating a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file; storing the updated set of metadata in the shared storage device and associating the updated set of metadata with the electronic file; and providing access to the updated set of metadata via an application utilized to access the electronic file.

A second aspect of the present invention provides a system for sharing file metadata in a networked computing environment, comprising: a memory device comprising instructions; a bus coupled to the memory device; and a processor coupled to the bus that when executing the instructions causes the system to: detect an opening of an electronic file while the electronic file is being stored in a cloud-based shared storage device of the networked computing environment; update a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file; store the updated set of metadata in the shared storage device and associate the updated set of metadata with the electronic file; and provide access to the updated set of metadata via an application utilized to access the electronic file.

A third aspect of the present invention provides a computer program product for sharing file metadata in a networked computing environment, the computer program product comprising a computer readable hardware storage device, and program instructions stored on the computer readable hardware storage device, to: detect an opening of an electronic file while the electronic file is being stored in a cloud-based shared storage device of the networked computing environment; update a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file; store the updated set of metadata in the shared storage device and associate the updated set of metadata with the electronic file; and provide access to the updated set of metadata via an application utilized to access the electronic file.

A fourth aspect of the present invention provides a method for deploying a system for sharing file metadata in a networked computing environment: providing a computer infrastructure being operable to: detect an opening of an electronic file while the electronic file is being stored in a cloud-based shared storage device of the networked computing environment; update a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file; store the updated set of metadata in the shared storage device and associate the updated set of metadata with the electronic file; and provide access to the updated set of metadata via an application utilized to access the electronic file.

BRIEF DESCRIPTION OF THE DRAWINGS

These and other features of this invention will be more readily understood from the following detailed description of the various aspects of the invention taken in conjunction with the accompanying drawings in which:

FIG. 7 depicts a process flow diagram according to an embodiment of the present invention.

FIG. 8 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
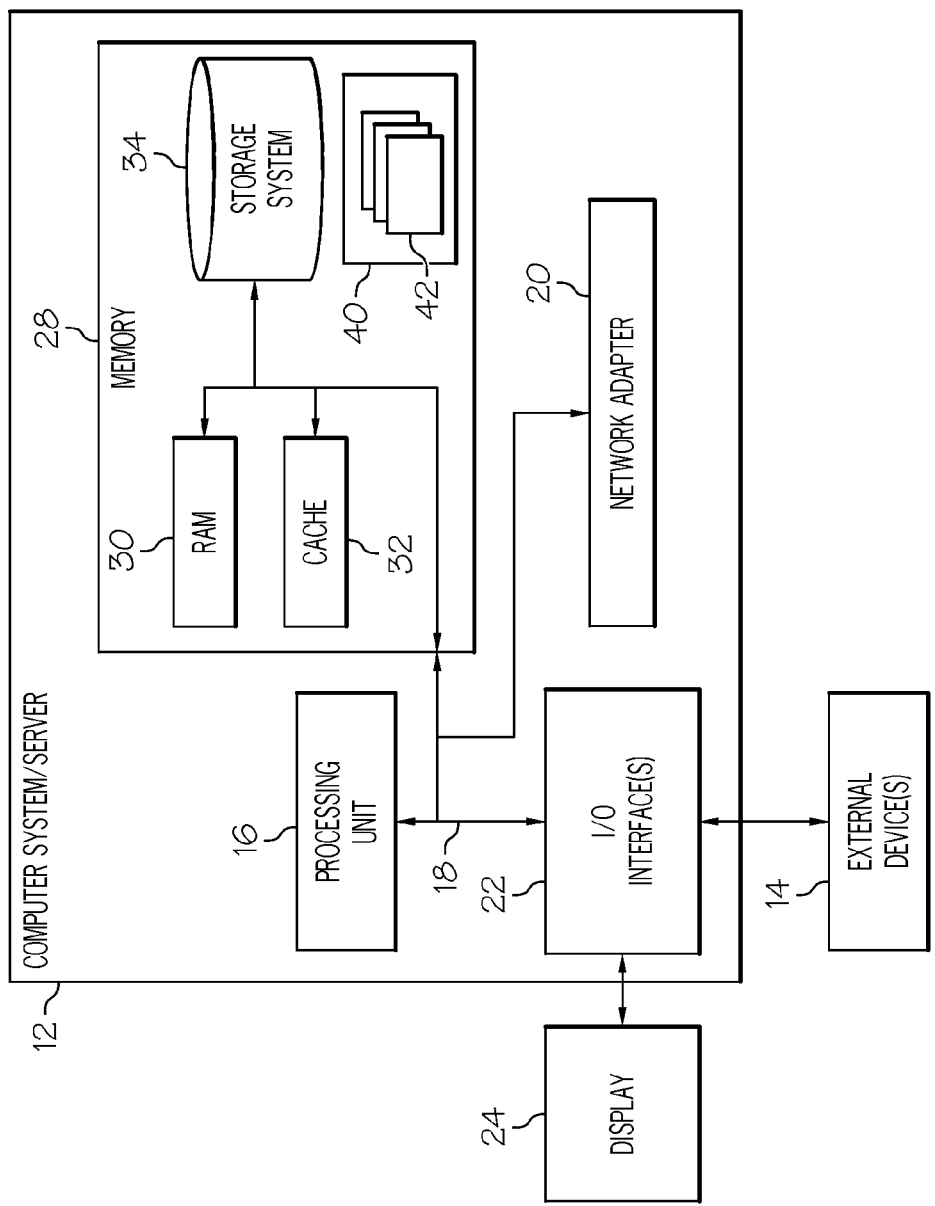
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for sharing electronic file metadata in a networked computing environment (e.g., a cloud computing environment). In a typical embodiment, metadata related to electronic files stored in a shared storage device is maintained and updated. Such metadata may be viewable via a user interface of one or more applications used to access the files (e.g., from a plurality of computerized/electronic devices). Among other things, the metadata may identify previous accessing of the files (e.g., by user, date/time, etc.), and may be provided in a list or the like.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
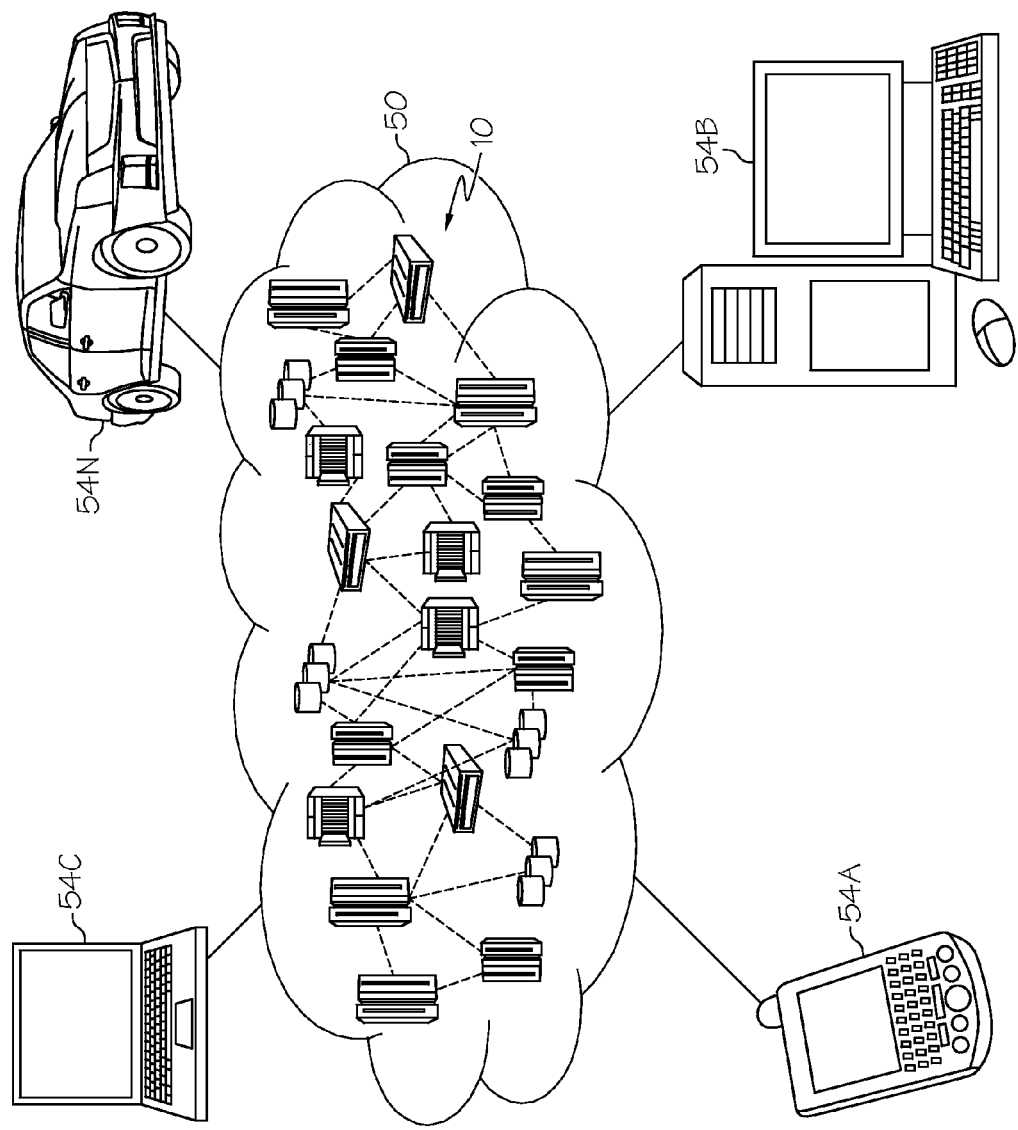
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
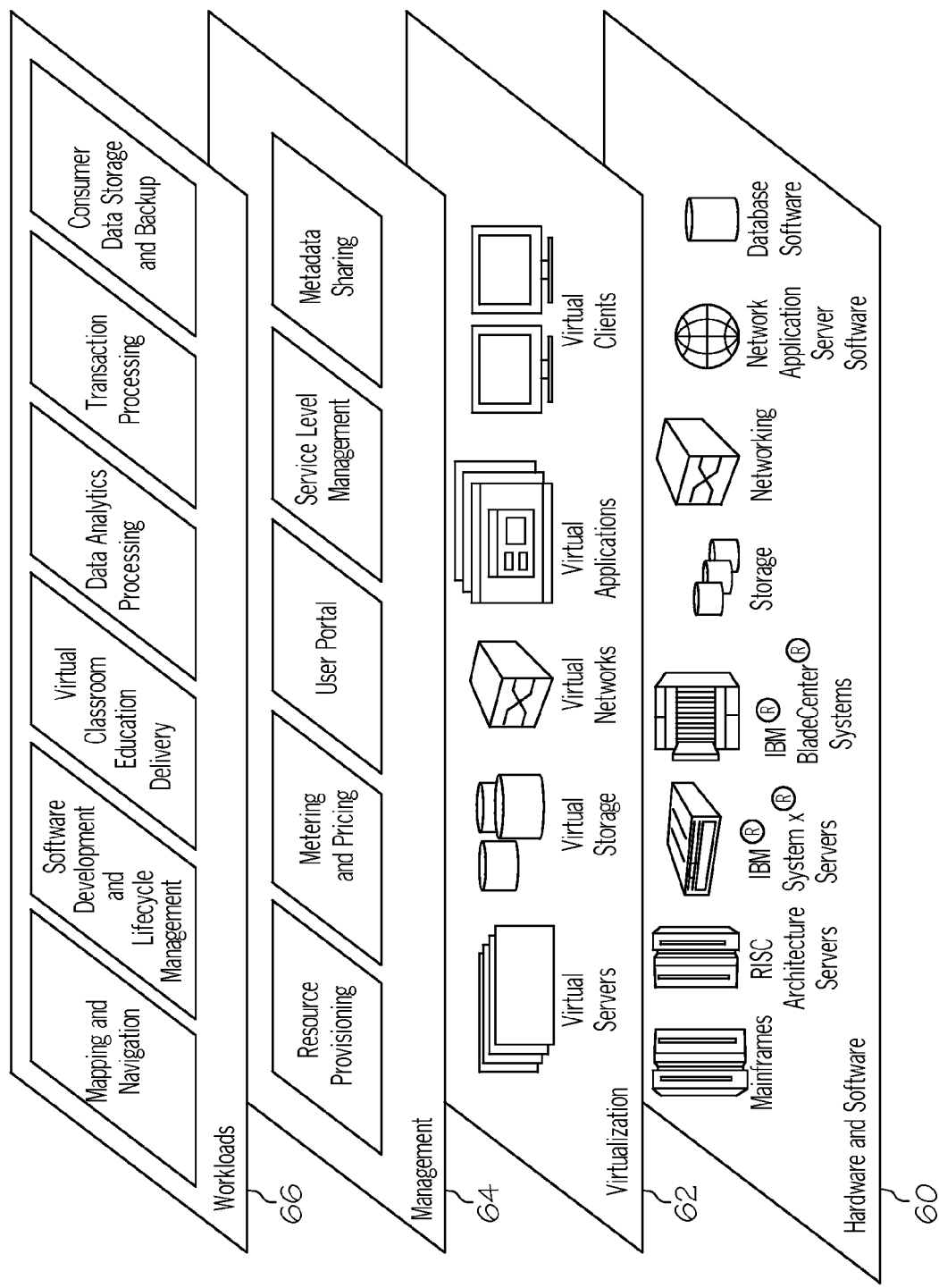
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is metadata sharing, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the metadata sharing functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
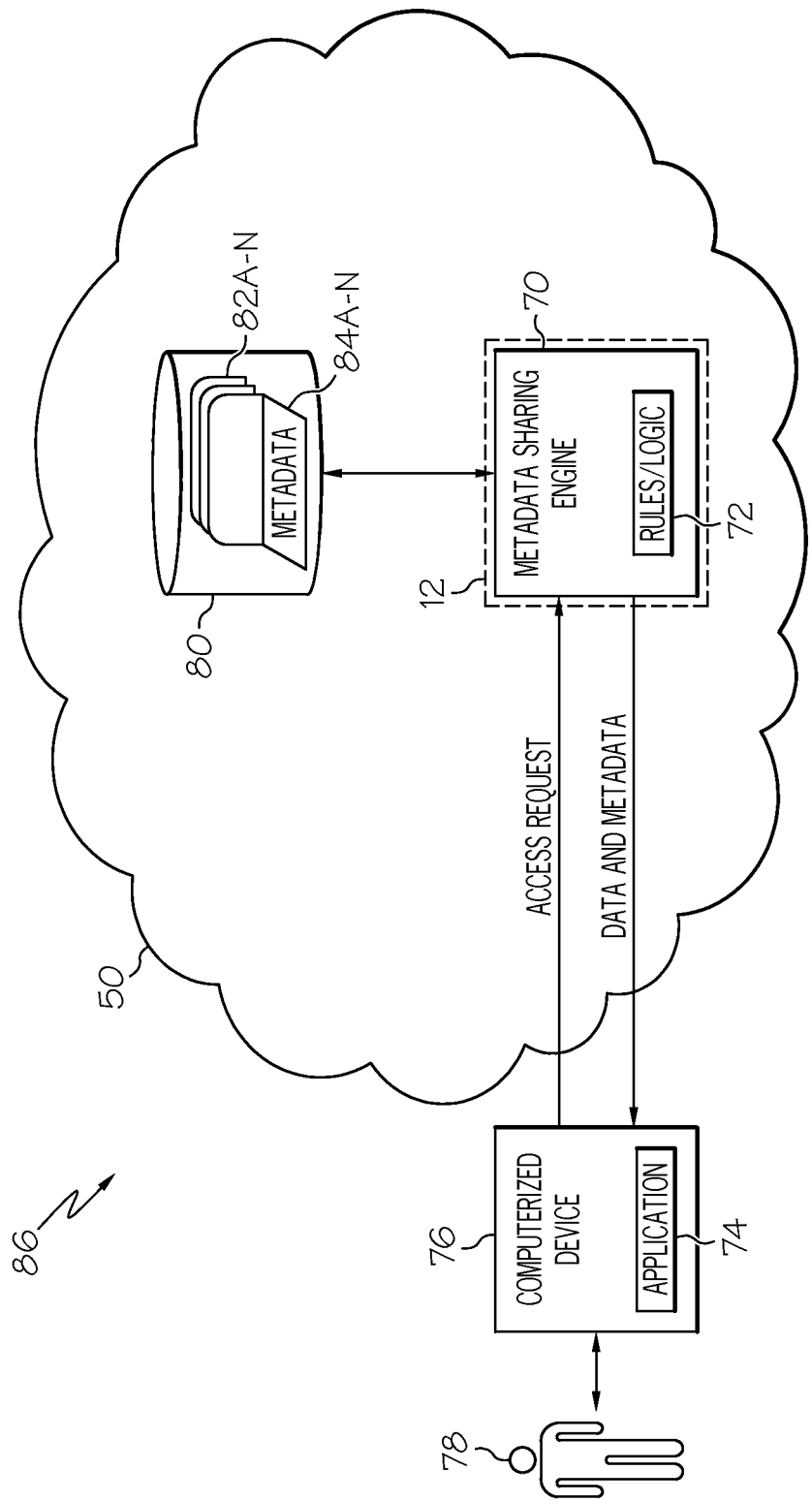
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a metadata sharing engine (engine 70). Rather, engine 70 could be loaded on a server or server-capable device that communicates (e.g., wirelessly) with the clients to provide metadata sharing therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides metadata sharing hereunder.

Along these lines, engine 70 may perform multiple functions similar to a general-purpose computer. Specifically, among other functions, engine 70 may (among other things): detect access to an electronic file 82A-N stored in a shared storage device 80 of the networked computing environment 86 (e.g., via an application 74 on a computerized device 76 operated by a user 78); update a set of metadata 84A-N associated with the electronic file 82A-N to reflect the access to the electronic file 82A-N; store the updated set of metadata 84A-N in the shared storage device 80 and associating the updated set of metadata 84A-N with the electronic file 82A-N; provide access to the updated set of metadata 84A-N via an application 74 utilized to access the electronic file 82A-N (e.g., from one or more computerized devices such as computerized device 76); and/or display the updated set of metadata 84A-N via a user interface associated with the application (e.g., a list of recently accessed electronic files 82A-N in the shared storage device 80. The list may identify the electronic file 82A-N, a user accessing the electronic file 82A-N, a date/time the electronic file 82A-N was last accessed, etc.

In general, these concepts may be implemented using the following implementation:
1. An application (e.g., a text editor, a text viewer, tools application, etc.) opens a file which could be in a shared storage device/location (e.g., a cloud storage device).
2. The application maintains a list of the recently used/accessed files.
3. When the list is updated with metadata to reflect the current use of the file, the system may publish the list to the shared storage device (shared storage, cloud storage, etc.) where other devices can also access the file and/or list.
4. A user logs into a computerized device that has access to the same shared storage device and/or file.
5. The user opens the application, which reads the metadata of the list of recently used files.
6. The application may then retrieve a selected file from the shared storage device.

It is understood that the metadata created and/or updated hereunder need not be limited to a recent file list. Rather, metadata may include any type of metadata that an application can maintain. Moreover, if a cloud-based storage mechanism is shared across a group of individuals, an identity of the last user to modify a given file could be shown next to the file in the recent file list. Alternatively, a user may set a preference to only view those files in which the user was the last to edit.

Illustrative Example

Figure 5:
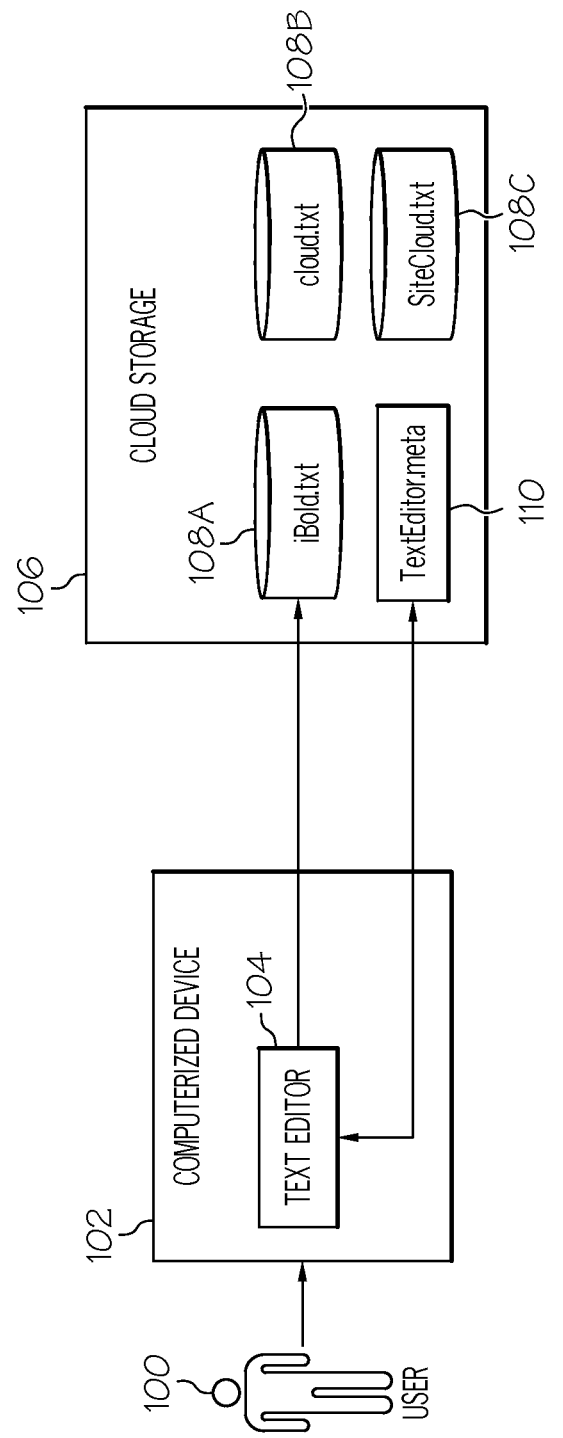
FIG. 5 depicts a process flow diagram according to an embodiment of the present invention.
Figure 6:
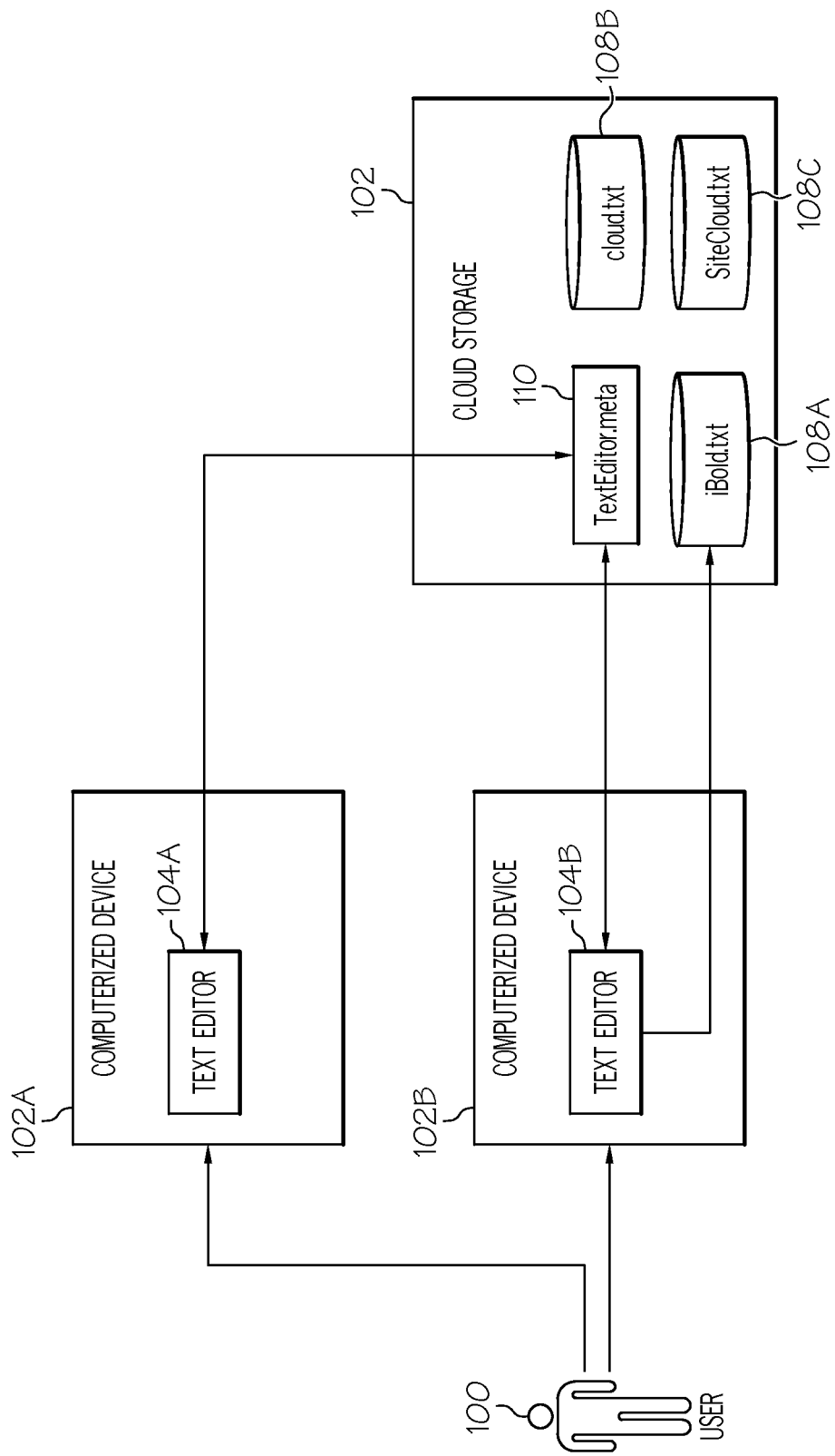
FIG. 6 depicts another process flow diagram according to an embodiment of the present invention.

FIGS. 5-7 depict the above teachings in accordance with an illustrative example. It is understood in advance, however, that these teachings demonstrated in FIGS. 5-7 are illustrative only and that similar teachings may be applied to other implementations hereunder.

As shown in FIG. 5, a user 100 connects to a machine/computerized device 102 and uses an application (e.g., text editor 104) to work on one or more files 108A-C that are located in a cloud storage system 106. When the application initiates, or has an update of metadata, the application may "push" a corresponding metadata file 110 to cloud storage system 106 as well.

Referring now to FIG. 6, assume that user 100 logs into a different computing device 102B (as opposed to computing device 102A) that has the same application 104B (as opposed to 104A) and also access to files 108A-C stored in cloud storage system 102. Under the teachings recited herein, user 100 may access metadata file 110 regardless of which device he/she utilized. Moreover, the system herein may represent metadata file 110 graphically in a list displayed via the user interface corresponding to application 104.

Referring to FIG. 7, an illustrative user interface 200 according to an embodiment of the present invention is shown. As shown, interface 200 may include a list 202 as generated by engine 70 (FIG. 4). The list may include local files 204 and/or shared files 206. List 202 may be augmented with other metadata such as which users have most recently accessed the files, the date/time of last access, the geographic location from which the files were last accessed, etc.

Referring now to FIG. 8, a method flow diagram according to an embodiment of the present invention is shown. As depicted, in step S1, access to an electronic file stored in a shared storage device of the networked computing environment is detected. In step S2, a set of metadata associated with the electronic file is updated to reflect the access to the electronic file. In step S3, the updated set of metadata is stored in the shared storage device and associates the updated set of metadata with the electronic file. In step S4, access to the updated set of metadata is provided via an application (e.g., via a list displayed via a user interface of the application) utilized to access the electronic file.

While shown and described herein as a metadata sharing solution, it is understood that the invention further provides various alternative embodiments. For example, in one embodiment, the invention provides a computer-readable/useable medium that includes computer program code to enable a computer infrastructure to provide metadata sharing functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide metadata sharing functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for metadata sharing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for sharing file metadata in a networked computing environment, comprising:
    detecting an opening of an electronic file while the electronic file is being stored in a cloud-based shared storage device of the networked computing environment;
    updating a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file and a location where the electronic file was last accessed;
    storing the updated set of metadata in the shared storage device and associating the updated set of metadata with the electronic file; and
    providing access to the updated set of metadata via an application utilized to access the electronic file, wherein the updated set of metadata is filtered to provide a view of a file which at least one of: the user was the last to access or was last accessed at a particular location.

2. The computer-implemented method of claim 1, the opening being attempted from a first computerized device.

3. The computer-implemented method of claim 2, further comprising accessing the updated set of metadata from a second computerized device.

4. The computer-implemented method of claim 1, the providing access to the updated set of metadata comprising displaying the updated set of metadata via a user interface associated with the application.

5. The computer-implemented method of claim 1, the networked computing environment comprising a cloud computing environment, and the shared storage device comprising a cloud storage device.

6. A system for sharing file metadata in a networked computing environment, comprising:
    a memory device comprising instructions;
    a bus coupled to the memory device; and
    a processor coupled to the bus that when executing the instructions causes the system to:
    detect an opening of an electronic file while the electronic file is being stored in a cloud-based shared storage device of the networked computing environment;
        update a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file and a location where the electronic file was last accessed;
        store the updated set of metadata in the shared storage device and associate the updated set of metadata with the electronic file; and
        provide access to the updated set of metadata via an application utilized to access the electronic file, wherein the updated set of metadata is filtered to provide a view of a file which at least one of: the user was the last to access or was last accessed at a particular location.

7. The system of claim 6, the opening being attempted from a first computerized device.

8. The system of claim 7, the memory device further comprising instructions for causing the system to access the updated set of metadata from a second computerized device.

9. The system of claim 8, the networked computing environment comprising a cloud computing environment, and the shared storage device comprising a cloud storage device.

10. The system of claim 6, the memory device further comprising instructions for causing the system to display the updated set of metadata via a user interface associated with the application.

11. A computer program product for sharing file metadata in a networked computing environment, the computer program product comprising a computer readable hardware storage device, and program instructions stored on the computer readable hardware storage device, to:
    detect an opening of an electronic file while the electronic file is being stored in a cloud-based shared storage device of the networked computing environment;
    update a set of metadata associated with the electronic file to reflect the opening of the electronic file, wherein the updated set of metadata is represented as a list of recently accessed electronic files in the shared storage device, the list identifying the electronic file, and wherein the updated set of metadata identifies a user to last access the electronic file and a location where the electronic file was last accessed;
    store the updated set of metadata in the shared storage device and associate the updated set of metadata with the electronic file; and
    provide access to the updated set of metadata via an application utilized to access the electronic file, wherein the updated set of metadata is filtered to provide a view of a file which at least one of: the user was the last to access or was last accessed at a particular location.

12. The computer program product of claim 11, the opening being attempted from a first computerized device.

13. The computer program product of claim 12, the computer readable hardware storage device further comprising instructions to access the updated set of metadata from a second computerized device.

14. The computer program product of claim 11, the computer readable hardware storage device further comprising instructions to display the updated set of metadata via a user interface associated with the application.

15. The computer program product of claim 11, the networked computing environment comprising a cloud computing environment, and the shared storage device comprising a cloud storage device.

\* \* \* \* \*